United States Patent
Shanson

(10) Patent No.: US 9,282,360 B2
(45) Date of Patent: Mar. 8, 2016

(54) SYSTEM AND METHOD FOR MAINTAINING INTEGRITY OF AUDIO DATA IN A MULTIPLEXED AUDIO/VIDEO STREAM OVER A LOW-LATENCY NETWORK CONNECTION

(71) Applicant: Spencer Shanson, Menlo Park, CA (US)

(72) Inventor: Spencer Shanson, Menlo Park, CA (US)

(*) Notice: Subject to any disclaimer, the term of this patent is extended or adjusted under 35 U.S.C. 154(b) by 0 days.

(21) Appl. No.: 14/374,180

(22) PCT Filed: Jan. 23, 2013

(86) PCT No.: PCT/US2013/022812
§ 371 (c)(1),
(2) Date: Jul. 23, 2014

(87) PCT Pub. No.: WO2013/112637
PCT Pub. Date: Aug. 1, 2013

(65) Prior Publication Data
US 2015/0046965 A1  Feb. 12, 2015

Related U.S. Application Data

(60) Provisional application No. 61/590,207, filed on Jan. 24, 2012.

(51) Int. Cl.
| | |
|---|---|
| H04J 3/06 | (2006.01) |
| H04N 21/43 | (2011.01) |
| H04N 21/2368 | (2011.01) |
| G11B 20/10 | (2006.01) |
| G11B 27/30 | (2006.01) |
| H04N 5/04 | (2006.01) |
| H04N 21/2381 | (2011.01) |
| H04J 3/00 | (2006.01) |
| H04N 11/02 | (2006.01) |
| H04N 7/173 | (2011.01) |
| H04N 21/462 | (2011.01) |
| H04N 21/8547 | (2011.01) |

(52) U.S. Cl.
CPC ...... *H04N 21/4307* (2013.01); *G11B 20/10527* (2013.01); *G11B 27/3027* (2013.01); *G11B 27/3036* (2013.01); *H04N 5/04* (2013.01); *H04N 21/2368* (2013.01); *H04N 21/2381* (2013.01); *H04N 21/43* (2013.01); *H04N 21/4622* (2013.01); *H04N 21/8547* (2013.01)

(58) Field of Classification Search
CPC ............. G11B 20/10527; G11B 27/3027; G11B 27/3036; H04N 21/2368; H04N 21/4307; H04N 21/2381; H04N 21/43; H04N 5/04; H04N 21/4622; H04N 21/8547
USPC ......... 370/503, 512, 515, 518, 521; 375/240.28, 240.01; 725/116, 87, 90, 725/93
See application file for complete search history.

(56) References Cited

U.S. PATENT DOCUMENTS

| | | | | |
|---|---|---|---|---|
| 5,594,660 | A * | 1/1997 | Sung et al. | 715/203 |
| 5,596,420 | A * | 1/1997 | Daum | 386/241 |
| 5,598,352 | A * | 1/1997 | Rosenau et al. | 715/203 |
| 5,674,003 | A * | 10/1997 | Andersen | H04M 3/567 348/14.08 |
| 2002/0154691 | A1* | 10/2002 | Kost et al. | 375/240.01 |
| 2005/0281255 | A1* | 12/2005 | Davies | H04N 21/235 370/389 |
| 2010/0235486 | A1* | 9/2010 | White et al. | 709/223 |
| 2011/0221960 | A1* | 9/2011 | Glaznev et al. | 348/515 |

\* cited by examiner

*Primary Examiner* — Hoang-Vu A Nguyen-Ba
(74) *Attorney, Agent, or Firm* — LaRiviere, Grubman PC

(57) ABSTRACT

A system and method for allowing streaming audio to be transmitted in advance of streaming video in a data stream without synchronization errors, in order to minimize audio discontinuities, even where video transmission may become degraded.

2 Claims, 6 Drawing Sheets

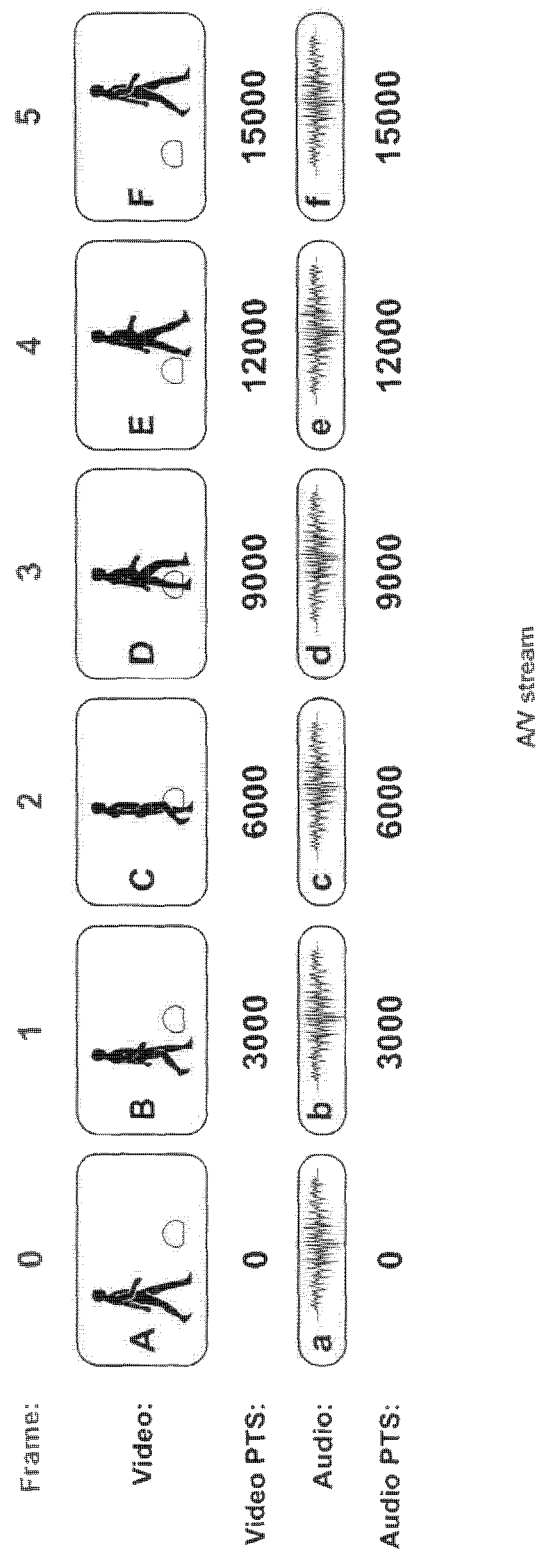

FIG. 4: Connected TV loses network access for two frames

SYSTEM AND METHOD FOR MAINTAINING INTEGRITY OF AUDIO DATA IN A MULTIPLEXED AUDIO/VIDEO STREAM OVER A LOW-LATENCY NETWORK CONNECTION

CROSS-REFERENCE TO RELATED APPLICATION

This application is entitled to the benefit of, and claims priority to U.S. Provisional Application 61/590,207, filed on Jan. 24, 2012, which is included by reference as if fully set forth herein.

TECHNICAL FIELD

The technical field is digital communication.

BACKGROUND ART

It is well understood that consumers of streaming data will tolerate breaks or gaps in video much better than audio. A consumer may hardly notice a temporary drop from 30 frames per second (fps) to 15 fps (a loss of 50% of the video frames), as long as audio continues to play. Consumers may even tolerate very short drops to 5 fps if the audio remains continuous. However, if the audio cuts out, even for very brief periods of time, the results can be very disruptive. Depending on frequency and duration, loss of audio may result in "pops" or other jarring artifacts, failure to hear critical dialogue, etc.

Many video encodings and file formats allow for variable frame rates. Given the ubiquity of multitasking computing environments, it is fairly standard for three dimensional (3D)-intensive computer programs (e.g., modern video games, 3D modeling and rendering software, etc.) to make efficient use of available hardware by rendering "as fast as possible" while still preserving computing resources to remain responsive to user input. The specific rate might be different from machine to machine or minute to minute on the same machine. For example, the program may render at one frame rate when the underlying hardware is relatively idle, but reduce that frame rate, should computing resources become more scarce (e.g., during background ray-tracing).

However, streaming data over a network connection is not quite as simple. It requires the server to know not only the display capabilities of the remote client, as well as the network bandwidth available for transmission, but also to be able to observe and respond to environmental changes. Historically, attempts to address this issue required a client to manually select among several different "qualities" of encodings of the same content. Where latency was high or throughput low, clients tried to "guess" at how much advance data needed to be temporarily stored or "buffered" to ensure uninterrupted playback of the entire stream. Estimates that were inadequate resulted in playback that would "hang" before continuing. Only recently have we seen crude automated mechanisms to vary frame rate, bit rate, or quality in response to changes in client capabilities during playback. However, "skipping", "lagging", or "pausing" audio and video remains an issue where servers cannot respond fast enough to unpredicted environmental changes.

The GXF container file format allows for the storage of audio data immediately preceding the video frame data with which it is associated. However, the storage order is specific to that file format.

While various decoders allow for discarding out-of-band (i.e., "late") audio and video data, to date, no file format or transmission technology exists that allows for the receipt and buffering of audio data well in advance of the video data with which it is associated to insure that audio data will be available, even where video temporarily may not be. In contexts where raw video and audio data are transmitted (e.g., without metadata like timestamps or sequence numbers), if one were to send audio data well before video data, it would result in synchronization errors, which become noticeable where audio precedes or "leads" video by as little as 25-35 ms.

Tooyah, Inc. runs a system that comprises a web browser on a server accessible via a network. The web browser has a screen display and emits audio. This screen display and audio is converted into a stream of audio and video data that is sent over the network to a client. The client comprises software that can receive, decode, and display the stream as it is received. This is somewhat analogous to a screen-sharing application.

In the Tooyah system, the user interacts with the web browser via a remote control device such as an infrared remote control typically used for controlling televisions, or a network-connected device such as an iPhone or iPad. When the user presses a button on the remote control, a button event is transmitted to the server. The web browser receives the button event and updates its display and may also emit audio. As described above, the display updates and new audio are converted to a stream that is viewed and heard by the user. The time between the user pressing the button and the resulting stream data being perceived by the user must be as small as possible to appear responsive. That time should typically be less than 250 ms.

Because that time is so short, the client has very little opportunity to buffer incoming stream data. If audio data is included in the stream, then the client will have no more than 250 ms of encoded audio buffered. When transmitted over the network, the stream is comprised of data packets. If the network used to transmit the stream is the internet, then data packets can be dropped or delayed. As described more generally above, a delay of more than 250 ms in this case would cause the audio decoder to underflow, resulting in artifacts such as audio outages or pops.

What is needed is a technology for allowing streaming audio to be transmitted in advance of streaming video in a data stream without synchronization errors, in order to minimize audio discontinuities, even where video transmission may become degraded.

SUMMARY OF THE INVENTION

The present invention discloses a system and method for sending audio data in advance of related video frame data, where the audio data is resynchronized to the video frame data before display.

In the most basic embodiment, a server receives a request for a specific source of audio and video data to transmit to the client. The invention is file format agnostic. Audio and video source data may exist in a single multiplexed data container or may be separated among several files (potentially across many servers). The invention is not limited to fixed or variable frame rates or bit rates.

Before transmitting any video data, the server transmits n "units" of audio data associated with a start time or position t. t often coincides with the beginning of a data stream, but may indicate a position anywhere within that data stream (e.g., when a user wishes to resume playback of a previously, but partially viewed video). A "unit" may be a byte, a frame, a packet, a time interval, or any other metric which is commonly used to measure or marshal digital streaming data. n may be fixed, configurable, or arrived at dynamically to accommodate different environments. n may even change over time for the a single connection (see discussion of additional embodiments below).

Once the requisite units of audio data are transmitted, the server begins sending video units from position t alongside or interleaved with subsequent audio data. Note that video data corresponding to position t is transmitted near audio data corresponding to position t+n.

As the client receives audio data, it buffers that data in anticipation of receiving corresponding video data. Once the client receives the anticipated video data, it selects the already-buffered audio data that corresponds to that video data, and resynchronizes them for playback. This way, the client always has more audio data than video data.

Should the connection between the server and client slow or temporarily fail such that new video data is not received in time to continue playback, the client can "freeze" display of the last available video frame, and continue playback of the buffered audio. If data transmission from the server resumes before the audio buffer is exhausted, the audio will play uninterrupted for the duration of the lag or outage, and video will resume once it is corrected. After recovery of a slow or temporarily failed connection, the server sends any necessary additional audio data alongside its usual transmissions of video data and advanced audio data until the client's buffer is restored. The transmission of the additional audio could happen all at once, or could be interleaved with other data to allow the client to rebuild its complete buffer gradually.

In an alternate embodiment, the server could observe environmental changes, and dynamically increase or decrease n depending on those observations. For example, where the server recognizes that a connection has a sudden spike in intermittent transmission errors, it could slowly increase the value of n to increasingly favor audio over video during playback.

In another embodiment, video data is also buffered. In this case, like with existing technologies, the server transmits, and the client receives and buffers both audio and video data faster than the data should be resynchronized and played back. The difference in the case of the invention is that during normal operation, the client buffers n more units of audio than video.

In another embodiment, the server transmits interleaved video frames. For example, for a stream having video data intended to play back at 24 fps, in addition to sending the audio data as described above, the server sends m units worth of video frames comprising every fourth frame. It then sends the second batch of frames, each also four apart, then the third batch, and finally the forth, before moving to the next m units similarly batched. If the connection degrades at some point between transmissions of batches, the client has partial video data to allow uninterrupted playback at a reduced frame rate until connection quality improves.

BRIEF DESCRIPTION OF THE DRAWINGS

FIG. 1A depicts a synchronized view of a data stream comprising audio and video data in one embodiment of the invention.

DESCRIPTION OF THE EMBODIMENTS

Figure 1B:
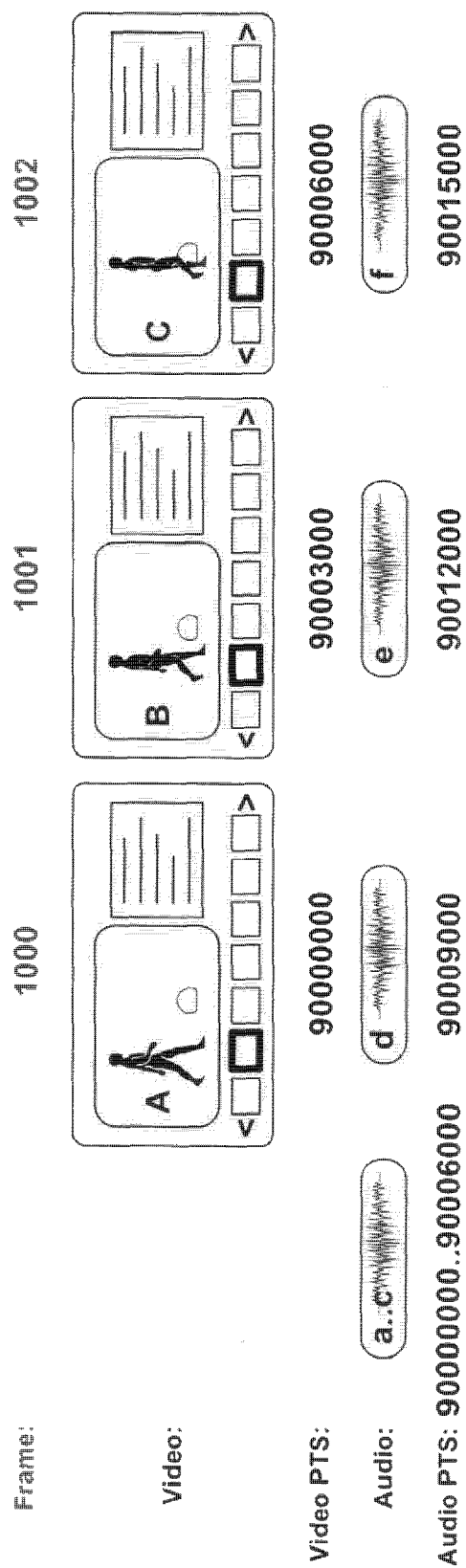
FIG. 1B depicts a transmission of the stream's audio data in advance of the video data by a server in one embodiment of the invention.

The following describes preferred embodiments. However, the invention is not limited to those embodiments. The description that follows is for purpose of illustration and not limitation. Other systems, methods, features and advantages will be or will become apparent to one with skill in the art upon examination of the following figures and detailed description. It is intended that all such additional systems, methods, features and advantages be included within this description, be within the scope of the inventive subject matter, and be protected by the accompanying claims.

FIG. 1A depicts a typical frame-by-frame view of a data stream 10 comprising audio data 15 and video data 20. The audio data 15 and video data 20 comprise audio packets 25 "a" through "f" and video frames 30 "A" through "F". The audio data 15 and video data 20 have been multiplexed such that audio packets 25 and video frames 30 are stored adjacent to and are in synchronization with each other. The audio packets 25 and video frames 30 include timestamps 35. For example, video frame 30 "B" has a timestamp 42 of "3000" and audio packet 25 "b" also has a timestamp 45 of "3000" indicating the video frame and the audio packet should be played together.

It is worth noting that FIG. 1A is somewhat of a simplification for the purposes of illustration. It represents decoded data as audio packets 25 and corresponding video frames 30. Modern streaming media formats have the ability to compress or encode audio data 15 and video data 20 among multiple audio layers and using multiple video frame types (including independent frames such as "intra" frames or "key" frames, dependent frames such as "inter" or forward-predicted frames, bidirectional or backward-predicted frames, etc.), which in turn can include other metadata such as macroblocks and motion vectors. In those encoded formats, multiplexing of audio data 15 and video data 20 is not limited to an entire single audio packet 25 preceded or followed by an entire single video frame 30.

FIG. 1B depicts the order of transmission of the data stream 10 of FIG. 1A according to the invention. In the depicted embodiment, the data stream 10 is embedded in a web page 60 via a <video /> tag 65, but this is not a necessary limitation of the invention. The invention pertains to any context in which streaming data is sent over a network (not depicted) from a server (not depicted) to a client (not depicted). n audio packets 25 are sent in advance of, and out of sequence from their corresponding video frames 30. As depicted in FIG. 1B, n is three, but could be any value. Values of 8-15 frames or the equivalent of 250-500 ms are typical in contexts requiring dynamic changes in response to user input. The first three audio packets 25 ("a" through "c") are sent in advance of any video frames 30. The first video frame 30 ("A") is sent with the fourth audio packet 25 ("d"), the second video frame 30 ("B") is sent with the fifth audio packet 25 ("e"), and so on.

Figure 2:
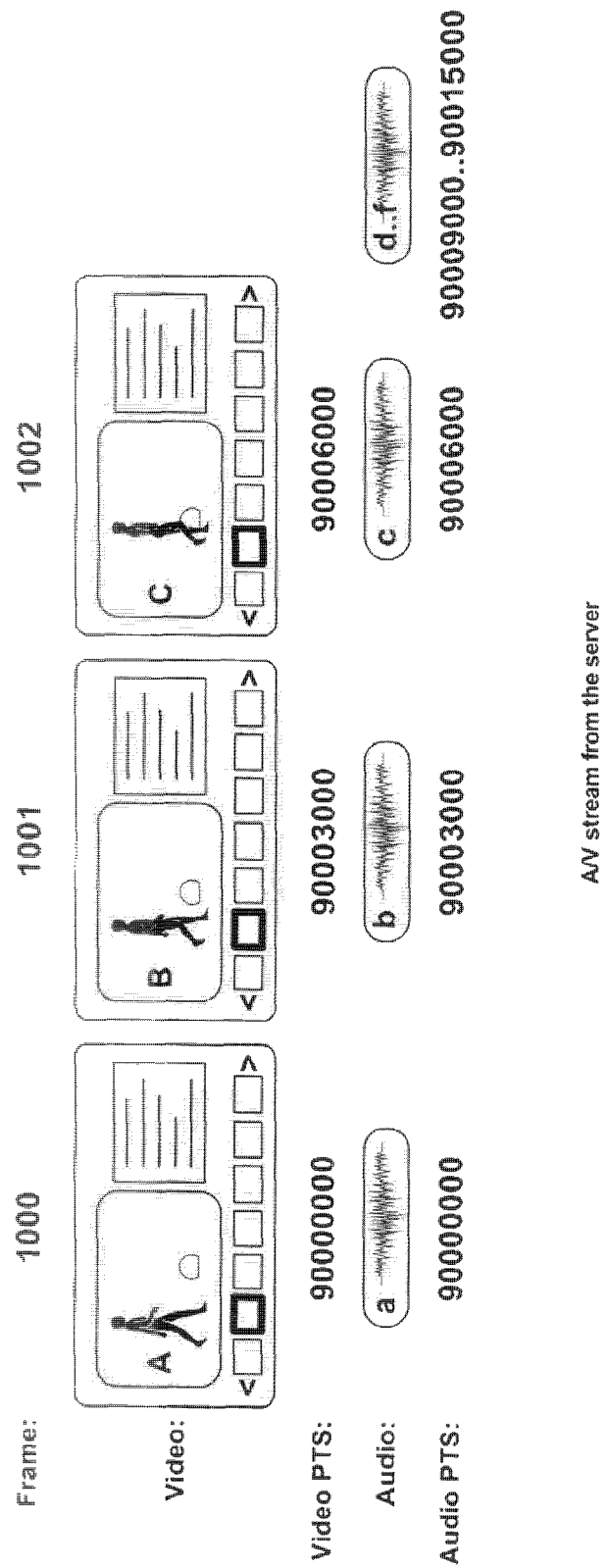
FIG. 2 depicts the resynchronization of the stream's audio and video data and buffering of audio data by a client in one embodiment of the invention.

FIG. 2 depicts the buffering of audio packets 25 by the client (not depicted), and the resynchronization of the audio packets 25 and video frames 30 according to one embodiment. The client receives the first three audio packets 25 ("a" through "c") before any video frames 30. Because it does not yet have any of the corresponding video frames 30, it stores the audio packets 25 temporarily in a buffer (not depicted). The buffer typically, but not necessarily comprises volatile memory (e.g., RAM), but could be any data storage mechanism. The client receives the first video frame 30 ("A") with the fourth audio packet 25 ("d"). The client matches the video frame 30 just received ("A") with the buffered audio packet 25 it previously received ("a") by their respective timestamps 35. The client resynchronizes and plays them concurrently for a user (not depicted).

Should the video frame 30 next in sequence ("B") arrive too late to be played without interruption, the client maintains display of the last received video frame 30 ("A") and plays the next audio packet 25 ("b"), allowing for uninterrupted audio playback.

Figure 3:
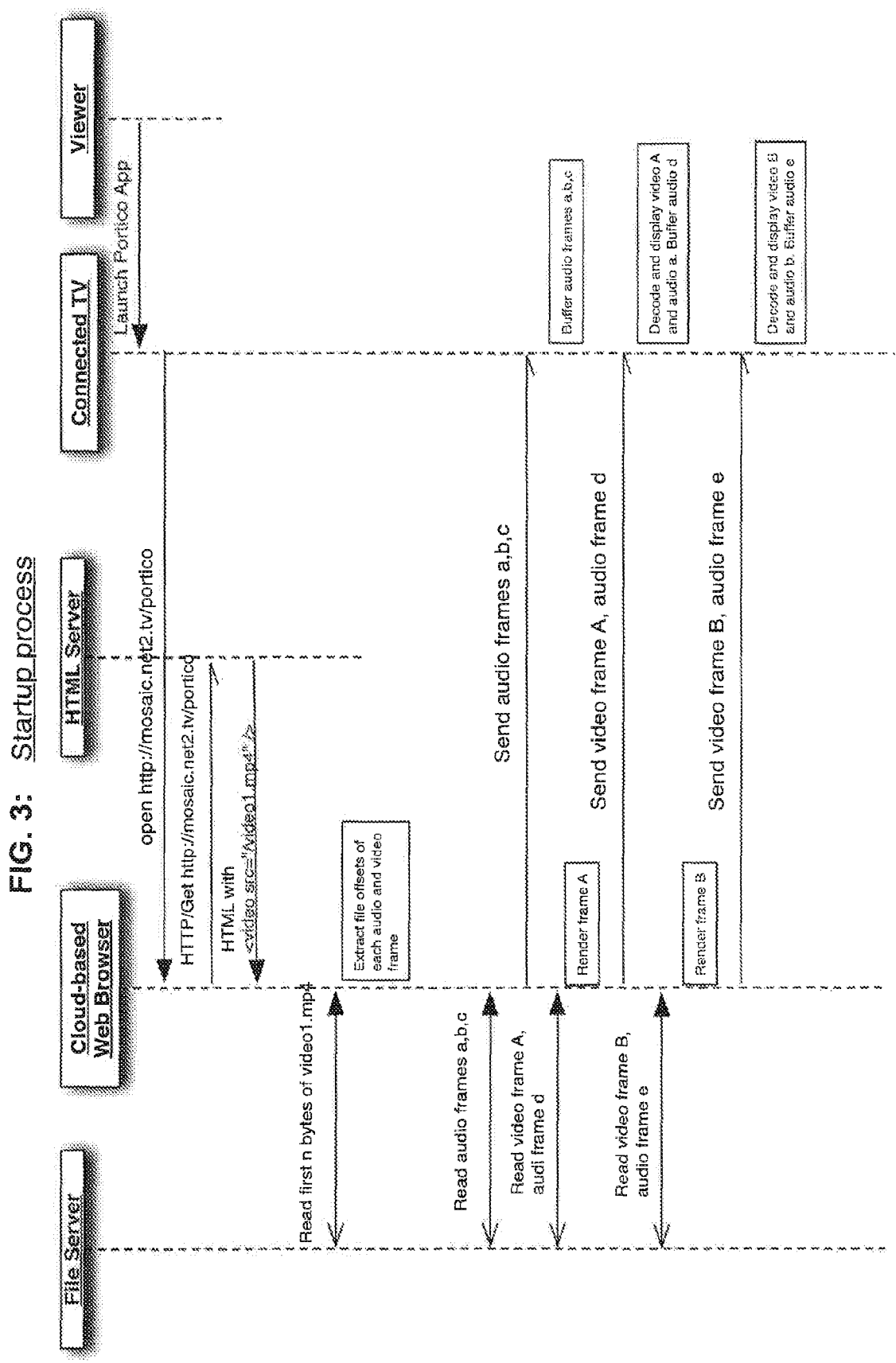
FIG. 3 depicts the reading of stream data comprising audio and video data from a data store, and transmitting of the audio data in advance of the video data by the server in one embodiment of the invention.

FIG. 3 depicts on embodiment of the invention in the form of a system for performing a process similar to FIG. 2. In this depiction, a server-side web browser 95 displays HTML elements (not depicted) of a web page 60, including content embedded via a <video /> tag 65. In this embodiment, the video data 20 of the data stream 10 comprises not only the embedded content, but a frame-by-frame screen capture of the entire web page 60 as rendered on the server 70. This allows the user (not depicted) to transmit commands to the server 70 which can interact with the web page 60 to: display specific embedded content; change embedded content; and perform other tasks (configure display preferences, select favorite genres, rate content, bookmark items, etc.). Depending on the interaction, the display of the web page 60 may change, resulting in those changes being transmitted to the client 75 as audio data 15 and video data 20 in accordance with the invention.

Figure 4:
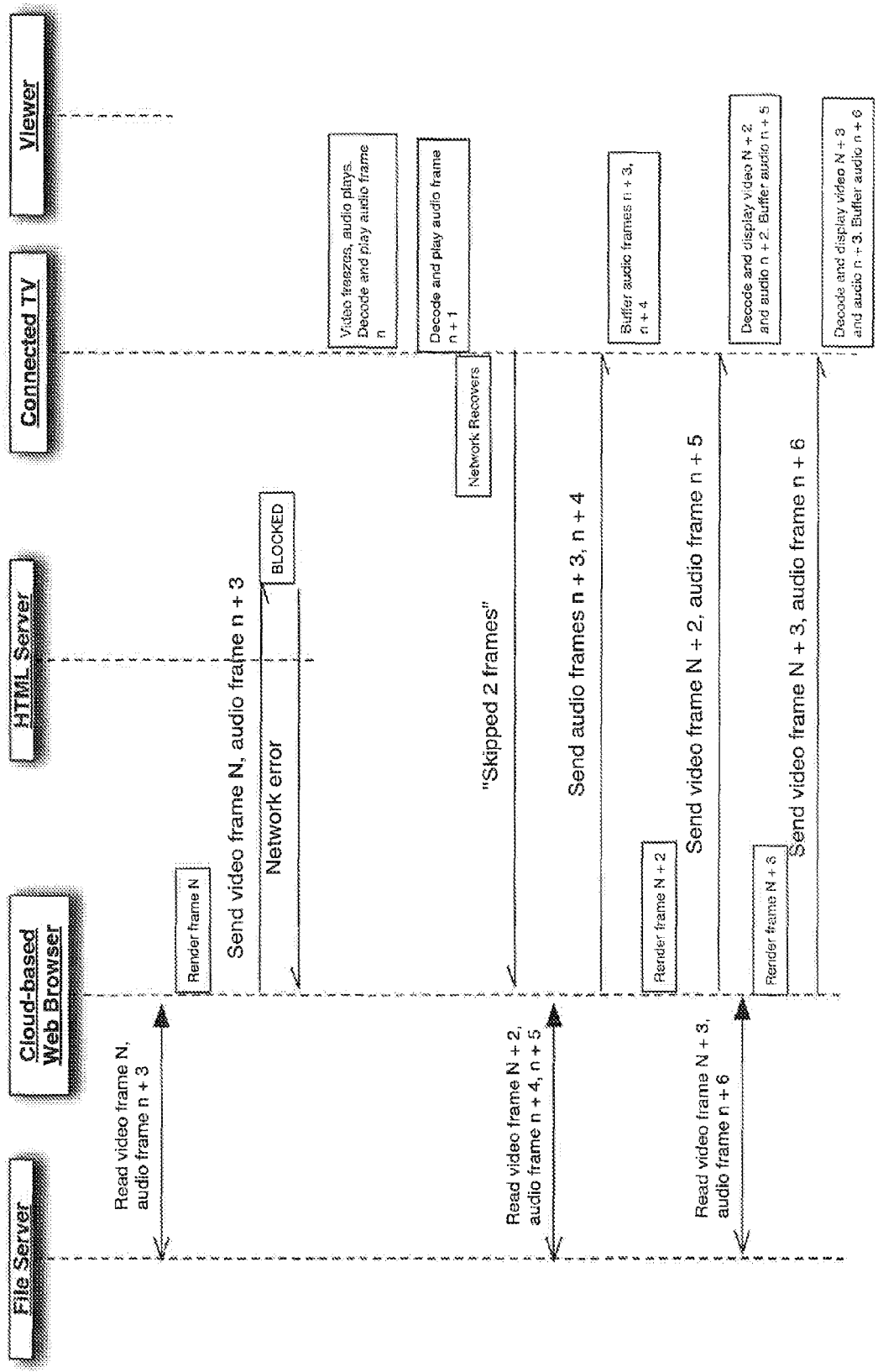
FIG. 4 depicts the receiving of stream data comprising audio data leading video data, and resynchronization before display by a client in one embodiment of the invention.

FIG. 4 depicts the system of FIG. 3 during a temporary network failure 80. In that case, as described above, the client 75 maintains its display of the last received video frame "N−1" (not depicted) and plays the buffered audio packets 25 ("n" and "n+1"). This allows uninterrupted audio playback while the client 75 signals to the server 70 that recovery is needed. The server 70 retransmits the missing audio packets 25 ("n+3" and "n+4"), as well as the next in sequence audio packets 25 ("n+5", etc.), and next in sequence video frames 30 ("N+2", etc.). Note that video frames 30 "N" and "N+1" are not retransmitted and are not displayed by the client 75. The next video frame 30 to be displayed is "N+2".

Figure 5:
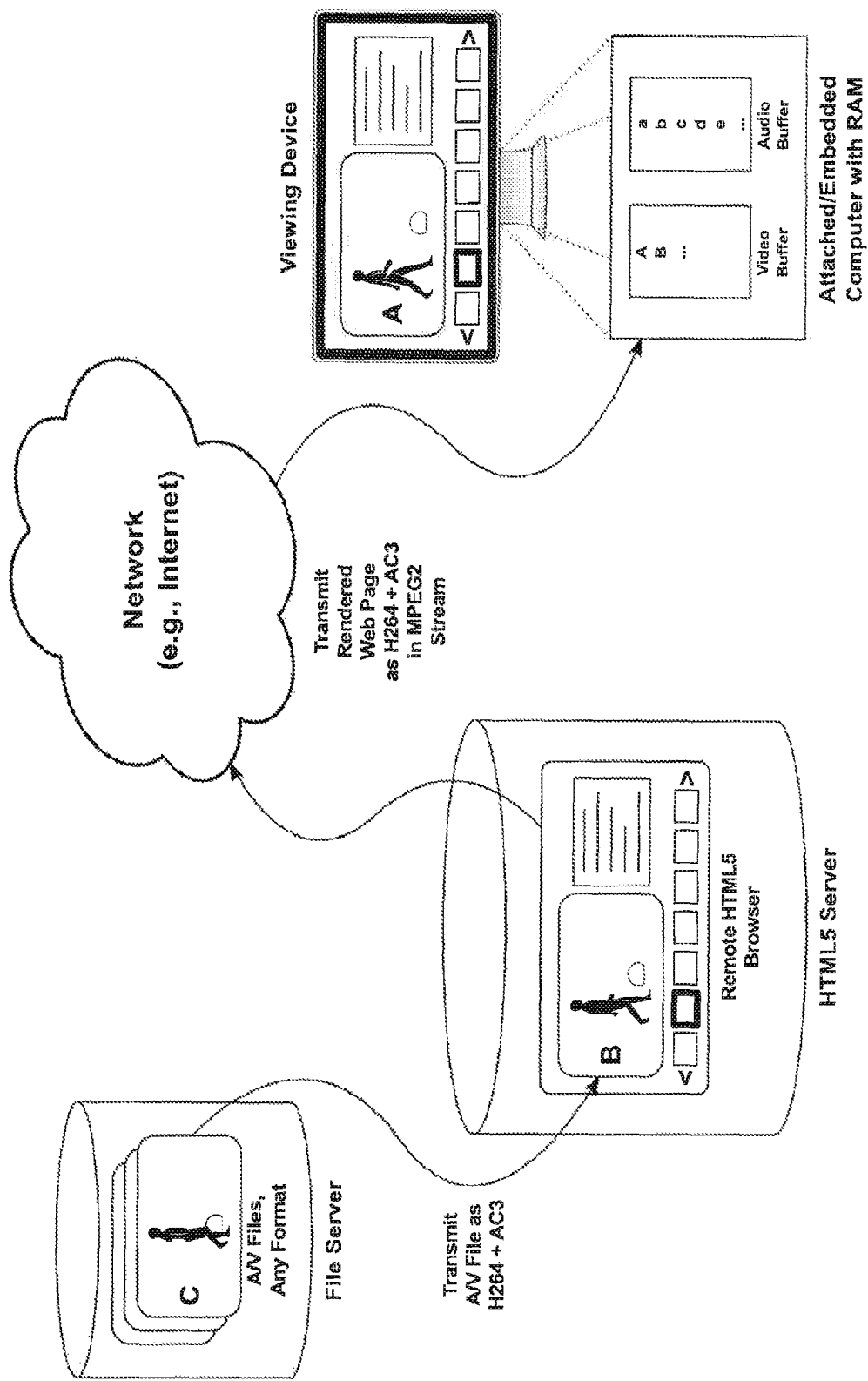
FIG. 5 is an architectural diagram of one embodiment of the invention.

FIG. 5 depicts an architectural diagram of a system similar to FIGS. 3 and 4 comprising: a data store 85, which—as depicted—is a file server 90; a server 70; a network 99; and a client 75. The server 70 further comprises a server-side web browser 95 which displays HTML elements 97 of a web page 60. The web page 60 further comprises embedded content rendered in a <video /> tag 65. The rendering of the web page 60 comprises audio data 15 and video data 20 which are transmitted in accordance with the invention over the network 99 to the client 75. The client resynchronizes the audio data 15 and video data 20 in accordance with the invention and plays them for a user (not depicted).

It is worth noting that in various embodiments, audio packets 25 and video frames 30 may be raw, encoded, compressed, or some combination thereof. If encoded or compressed, the audio packets 25 and video frames 30 are typically decoded by the client upon receipt, and the decoded audio packets (not depicted) are buffered. The audio data 15 and video data 20 may be transmitted to the client via any available network transport protocols (e.g., interleaved in a single TCP connection, separated over multiple concurrent TCP connections, via UDP packets, etc.) over any available network 99 (hardwired, WiFi, Bluetooth, etc.). Different protocols may require additional computation and communication between the client and server. For example, because UDP packets are not guaranteed to arrive in order, or at all, a client may have to perform its own windowing for the audio data 15 and the client and server may have to be configured to perform retries for sending lost audio data 15. Combinations of network protocols may be advantageous in certain circumstances (e.g., a TCP connection for audio data 15, UDP packets for video data 20, etc.).

INDUSTRIAL APPLICABILITY

The invention pertains to data streaming for remote display.

What is claimed is:

1. A system for maintaining continuity of audio playback from a multiplexed audio/video stream from a network server to a user, said system comprising:
   a. a data store for storing in and retrieving streaming data, wherein the streaming data further comprises:
      i. audio data;
      ii. video data; and
   b. the network server configured to:
      i. receive a request over a computer network from a client;
      ii. identify the streaming data to be transmitted to the client;
      iii. transmit audio portions of the streaming data before the video data is transmitted to the client; and
   c. wherein the client is configured to:
      i. receive and temporarily store the audio data that leads the video data;
      ii. receive the video data;
      iii. synchronize the temporarily stored audio data with the video data for playback on a display to the user.

2. The system of claim 1 wherein the audio data leads the video data by at least 1 video frame.

* * * * *